UNITED STATES PATENT OFFICE.

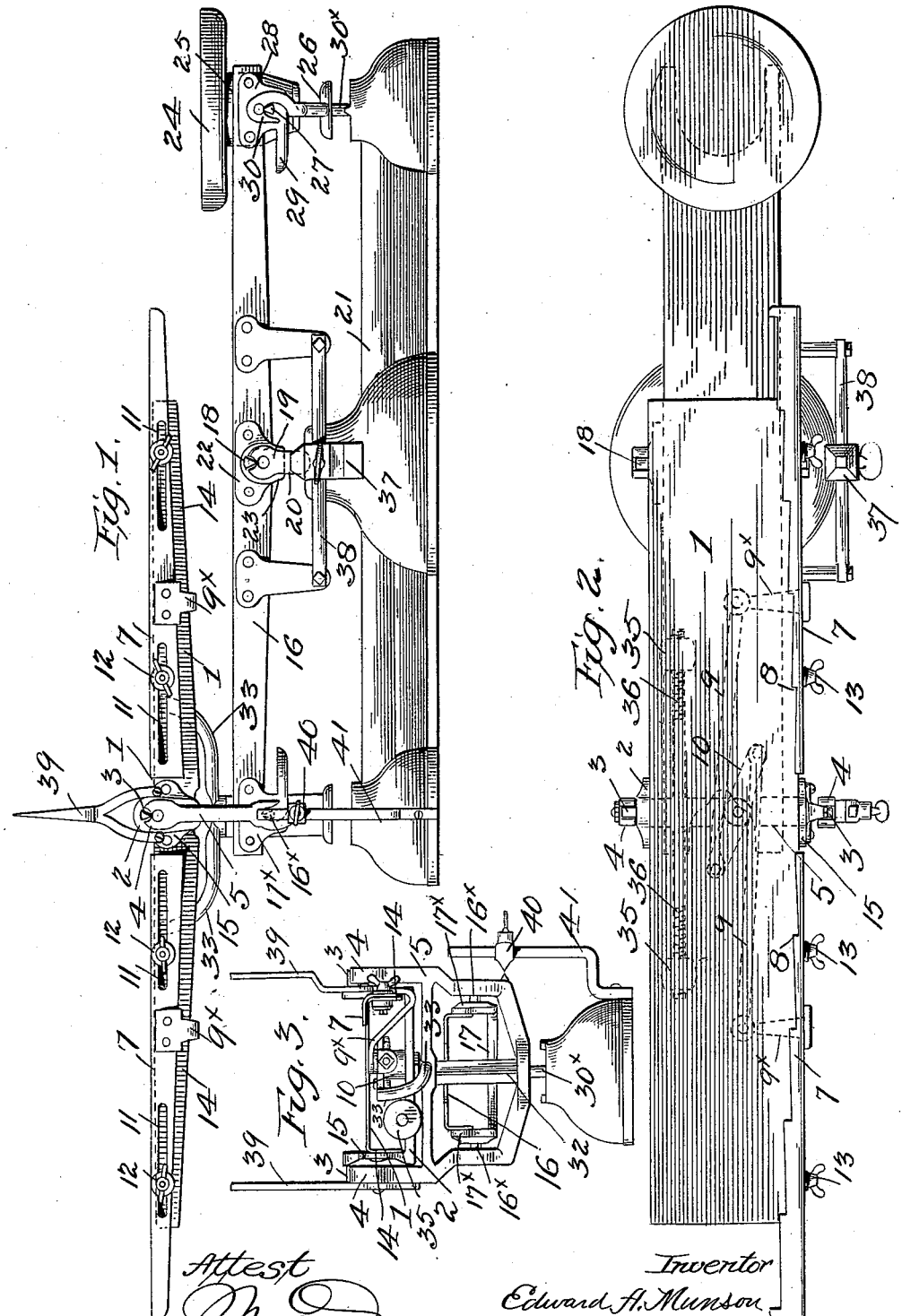

EDWARD A. MUNSON, OF GRAND RAPIDS, MICHIGAN.

PROPORTIONAL WEIGHING APPARATUS.

SPECIFICATION forming part of Letters Patent No. 557,140, dated March 31, 1896.

Application filed May 31, 1895. Serial No. 551,052. (No model.)

*To all whom it may concern:*

Be it known that I, EDWARD A. MUNSON, a citizen of the United States, residing at Grand Rapids, in the county of Kent and State of Michigan, have invented certain new and useful Improvements in Proportional Weighing Apparatus, of which the following is a specification, reference being had therein to the accompanying drawings.

It is the object of my invention to provide a weighing apparatus for use in obtaining the proportional weights of different parts of knives such as used in planers, and also for obtaining the total weights of said knives by one and the same machine and at one operation. Machines have been heretofore devised for obtaining by a succession of operations the relative or proportional weights between different parts of the knife and at another independent operation the total weight; but to work with such a machine requires much time and necessitates repeated handling of the knife before it can be balanced in its different parts and balanced in total weight in relation to the other knives designed to be attached to the same head. Planer-knives may be in perfect balance as regards total weight, but when fastened on the planer-head or cylinder the right end of one knife may be heavy, while the right end of the other knife may be light, and the ends on the left-hand side of the cylinder would be the reverse, resulting in a vibratory motion to the machine, which, besides being detrimental, interferes with good work and is generally objectionable.

My invention comprises a compound balance adapted to indicate not only the total weight, but also which end, if either, is heavier than the other.

In the accompanying drawings, Figure 1 is a side view; Fig. 2, a plan view with parts shown in dotted lines, and Fig. 3 an end view.

The knife to be weighed and to be balanced as to its end weights is placed on the platform 1, which is carried by the bracket 2, having knife-edge journals 3 working in bearings 4 of the frame 5. The platform is centrally balanced and the knife is placed thereon so that its ends will extend equally on each side of the pivot-point, and to determine the position of the knife adjustable slide-rests 7 are arranged along one side of the platform, one on each side of the pivot-point and of rightangular cross-section to fit the edge or side of the platform, and these slides have notches or shoulders 8 in their inner edges to bear against the ends of the knife; and as these slides are located at equal distances from the pivotal center, a knife having its ends bearing on corresponding notches of the slides will be centrally arranged in relation to the platform. The slides are adjusted simultaneously, so as to always bear the same relative position to the pivotal center, and this connection consists of rods 9 connected through brackets $9^\times$ with the slides, said rods being connected to opposite arms of a head or lever 10 pivoted to the frame 5. The slides have slots 11 receiving guiding-bolts 12, and a set-screw 13 is used to fix the slides in any desired position. The platform consists of sheet-steel having depending side flanges 14, and these are bolted or riveted to the ears 15 of the bracket 2. The carrying-frame 5, in which the journals of the bracket bear, is in turn carried by the main platform 16, for which purpose the main platform has journals $16^\times$ projecting from ears $17^\times$ riveted to the platform, said ears being connected by a cross-bar 17 below the main platform, and the said carrying-frame 5 rests pivotally upon the journals to maintain its upright position. This main platform is likewise formed of sheet-steel with downwardly-bent flanges, and it is centrally balanced by knife-edge journals 18, working in bearings 19, formed in upturned ears or sides of a cross-bracket 20, which is supported by the base 21. The journals 18 are formed on ears 22 of the cross-bar 23, said ears being attached to the sheet-steel flanges by rivets or bolts.

The supplemental balanced platform is carried at one end of the main platform, and at the other end of the main platform is fixed a tray or support for the counterbalance knife weight or weights. This tray 24 is on the standard 25 extending down between the bifurcated ends of the platform, (dotted lines, Fig. 2,) and supported on a transverse frame 26, which is pivoted to the end of the platform by the journals 27 on the ears 28 of the cross-piece 29 entering bearings 30 in said frame, the horizontal position of the tray being thereby maintained at all times.

The end frames 5 and 26 have depending guide-rods 30× entering the base and controlled in the ordinary manner to keep said frames upright.

In order to limit the movement of the supplemental balance so that the knife thereon cannot fall from the end or its weight fall on the lower platform and thus destroy the calculation, the frame 5 is formed with a post 32, at the top of which arms 33 project longitudinally of the supplemental platform and on each side thereof, so that the swing of the same will be limited. The platforms may be placed accurately in balance by adjustable weights 35 on screw-rods 36, which are held by the cross-bracket 2 under the platforms. The main platform has an additional adjustable weight 37 on a bar 38 extending alongside of the main platform and supported therefrom so as to hold the weight below the center of gravity. Pointers 39 are fixed one to the side of the supplemental platform and one to the frame 5, and these will indicate when the said platform is in balance. An adjustable pointer 40 on a post 41 will show when the main platform is balanced.

With scales now in use to obtain an accurate balance between the different parts involves a long and tedious process. First the light end of the knife is determined and weighed. Then the knife is reversed in position and by judging the amount to be removed by the amount the scale is thrown out of balance the knife is taken from the scales and ground down to the required weight to get the perfect balance. This may take two or more manipulations of the knife and grinder. The total weight of this knife is then determined. The next knife is then taken and its total weight reduced to the total weight of the balanced knife, and then by separate and distinct actions its ends are balanced up. When this is done, the total weights of the knives must be ascertained again by a separate action, as they have been thrown out of relative balance, and the process of balancing up gone over again until the knives are formed to correspond approximately in all respects.

In my machine, the knife being placed centrally on the supplemental platform, it can be seen at once which is the heavier end without requiring two separate and distinct weighing actions and its total weight can at the same time be seen, and if found to be above or below the required total weight or heavier on one end than on the other in proportion to the other knives of the set the knife is ground down until both parts of the scale will be balanced.

While I prefer the arrangement and form of the elements shown, I do not wish to confine myself thereto, the broad feature of my invention being the compound balance to secure end weights and total weights simultaneously.

Although I have shown the main part of the balance which carries the knife-holding platform in the form of a platform and have called it such herein, such part is merely in effect a balance-beam, and I do not wish to limit myself to the construction of this balanced beam or platform which I have shown and described.

What I claim is—

1. A proportional balance comprising a main balanced platform and a supplemental platform balanced on one end thereof with means for indicating when said supplemental platform is balanced.

2. A proportional balance for planer-knives and the like, to determine the relative end weights and total weight thereof, comprising a balanced platform to hold the knife with its ends projecting on each side of the same and the scale or balance in connection with the platform and adapted to indicate the movement thereof under the total weight of the knife, substantially as described.

3. A proportional balance for planer-knives and the like, consisting of a platform with indicating means to ascertain the end weights and a scale or balance connected therewith to indicate the movement thereof under the total weight of the knife, substantially as described.

4. A proportional balance for planer-knives and the like, consisting of a balanced platform and means carried thereby to hold the knife with its ends in proper relation on each side of the pivot-point, substantially as described.

5. In combination, the main balanced platform having the weight-tray on one end and the supplemental platform balanced on the other end, said supplemental platform having means for holding the knife centrally thereof, with its ends projecting on each side of the pivot of the supplemental platform substantially as described.

6. In combination in a proportional balance, the balanced platform and the adjustable rests or supports on each side of the center thereof arranged to hold the knife with its ends projecting on each side of the center.

7. In combination, in a proportional balance, the balanced platform, and the adjustable rests on each side of the center thereof arranged to hold the knife with its ends projecting on each side of the pivot and the connections between the rests to move them in unison.

8. In combination in a balance, the platform and the adjustable notched slides on each side thereof, substantially as described.

9. In combination, the balanced platform, the adjustable slides and the rods and lever connecting the slides, substantially as described.

10. In combination in a balance, the platform formed of sheet metal with downwardly-turned side flanges the pivot-bearings projecting therefrom and the frame in which the platform is journaled, substantially as described.

11. In combination in a balance, the platform of sheet metal with downwardly-turned side flanges, the cross-bar having upturned ears secured to the side flanges and the journals projecting from said ears, substantially as described.

12. In combination the main platform, the supplemental platform and the end frame pivoted to the main platform and extending therefrom, the said supplemental platform being journaled in the said end frame, substantially as described.

13. In combination, the main platform, the frame pivoted thereto and supported thereby, the supplemental platform balanced on the pivoted frame and the stops carried by the pivoted frame for limiting the movement of the supplemental platform, substantially as described.

In testimony whereof I affix my signature in presence of two witnesses.

EDWARD A. MUNSON.

Witnesses:
C. D. HARRINGTON,
HERBERT M. PIERCE.